United States Patent [19]
Giles

[11] Patent Number: 5,959,550
[45] Date of Patent: *Sep. 28, 1999

[54] REMOTE METER READING SYSTEM

[75] Inventor: Terence George Giles, Surrey, United Kingdom

[73] Assignee: Ramar Technology Ltd., Surrey, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,985

[22] Filed: Oct. 15, 1996

[30] Foreign Application Priority Data

Jan. 8, 1996 [GB] United Kingdom .................. 9600291

[51] Int. Cl.$^6$ .................................................. G08B 23/00
[52] U.S. Cl. .................. 340/870.02; 375/200; 375/201; 455/46; 340/870.03; 340/870.18
[58] Field of Search ................ 340/870.02, 870.25, 340/870.26, 870.18, 870.03; 332/103; 375/200, 201, 206; 455/46, 67.1

[56] References Cited

U.S. PATENT DOCUMENTS

| | | | |
|---|---|---|---|
| 5,438,329 | 8/1995 | Gastouniotis | 340/870.02 |
| 5,448,229 | 9/1995 | Lee | 340/870.02 |
| 5,459,459 | 10/1995 | Lee | 340/825.54 |
| 5,477,216 | 12/1995 | Lee | 340/870.03 |
| 5,541,589 | 7/1996 | Delaney | 340/870.02 |

*Primary Examiner*—Michael Horabik
*Assistant Examiner*—Albert K. Wong
*Attorney, Agent, or Firm*—Chapman and Cutler

[57] ABSTRACT

A remote meter reading system uses transponders adapted to transmit a spread spectrum signal which is generated by frequency modulating data with a carrier signal. The resulting output signal is then spread by phase modulating with a pseudo-random code signal before transmission with the carrier suppressed. At the receiver, the original suppressed carrier is regenerated by squaring a first IF signal and then applying the output signal to a narrow band receiver from which the data can be recovered with a conventional FM discriminator.

6 Claims, 1 Drawing Sheet

REMOTE METER READING SYSTEM

BACKGROUND OF THE INVENTION

1. Field of the Invention

The present invention relates to remote meter reading systems of the type which use transponders fitted to the meters and an interrogate/receiver instrument which sends out a common "wake up" signal to activate a group of transponders within range.

2. Description of Related Art

Examples of this type of meter reading system are described in U.S. Pat. No. 4,614,945 and U.S. Pat. No. 4,799,059 (ENSCAN).

In such remote meter reading systems the transponders are designed to transmit a data packet to the interrogate/receiver instrument when activated by the wake up signal. These data packets contain data identifying the meter number and readings. With any such system it is necessary to provide a solution to the technical problem of possible collision between the data packets transmitted by the transponders within the activated group.

In the ENSCAN patents described above, collision avoidance is provided by the transponders having a transmitter which has means of varying its transmission frequency in accordance with a pre-determined function. In this way, the data packet from the activated transponders may occur at different frequencies within a pre-determined frequency bandwidth. The ENSCAN patents also provide for repeated transmission of the data packet to assist collision avoidance.

The ENSCAN patents therefore disclose one example of spread spectrum modulation. However, this system requires the receiver instrument to have the ability to listen simultaneously on all possible channels on which the transponders may transmit. The collision avoidance technique is not guaranteed to succeed. There is only a statistical chance that the transmissions from the group of activated transponders will be received without collision. Repeated transmission is therefore also necessary.

Spread spectrum technology has been used in the field of radio communications to eliminate the effects of interference and to prevent eavesdropping. For a fuller description of spread spectrum technology and its implementation in communication systems, reference may be made to Spread Spectrum Systems, 2nd Edition by Robert C. Dixon, published by Wiley Intersciences (ISBN 0-471-88309-3) or Coherent Spread Spectrum Systems by Jack K. Holmes also published by Wiley Interscience (ISBN 0-471-03301-4).

As well as the frequency hopping type of spread spectrum technology used in ENSCAN, communications systems can use a technique known as direct sequence spread spectrum. In this technique the carrier is multiplied by a high speed psuedo-random digital code signal. A receiver provided with the same psuedo-random digital code signal can de-spread the received signal to regenerate the original carrier. In order to achieve regeneration it is necessary for the pseudo-random codes used by the transmitter and receiver to be locked together. This synchronization step can be obtained by a number of techniques. Such techniques, however, all take a significant time to achieve lock. In a typical application which uses a 127 chip maximum length pseudo-random code signal with an "early/late" delay lock loop it may take several seconds to achieve lock. This delay would make these techniques unsuitable for use in remote meter reading systems as it would prevent rapid reception of the data packet. Since transponders are normally battery powered, long transmissions must be avoided to reduce battery consumption. Remote meter reading systems may also require the interrogate/receiver instrument to be a vehicle which is driven past the meters to be read. This further limits the time during which the receiver is within range in order to complete the process.

SUMMARY OF THE INVENTION

The present invention is therefore directed towards solving the technical problem of obtaining the advantages of spread spectrum technology in a remote meter reading system.

BRIEF DESCRIPTION OF THE DRAWINGS

In order that the invention may be well understood an embodiment thereof will now be described, by way of example only, with reference to the accompanying diagrammatic drawings, in which.

DESCRIPTION OF THE PREFERRED EMBODIMENT

Domestic utility meters such as electricity and water meters can be provided with transponders which are fitted to the meter. Except for the design of the transmitter, the transponders to be used with the present system may be of any conventional design and will not therefore be described in further detail.

Figure 1:
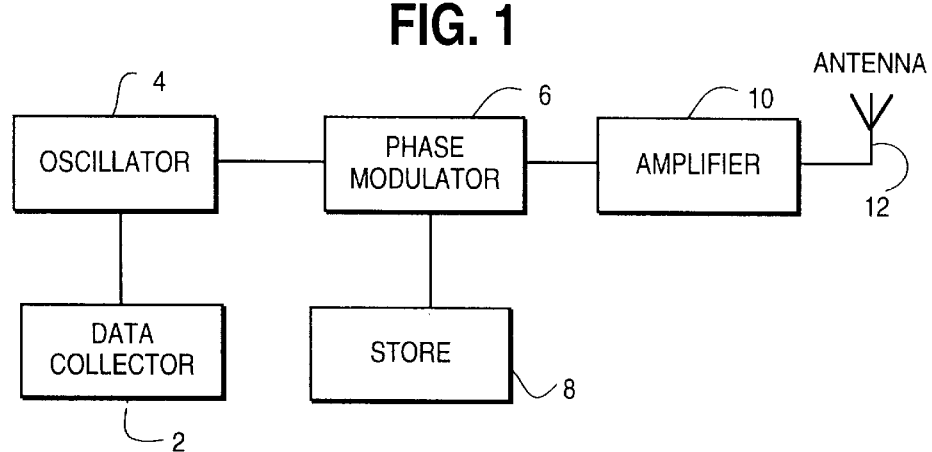
FIG. 1 shows a block diagram of a spread spectrum transmitter used in a transponder of a remote meter reading system.

The transmitter arrangement is shown in FIG. 1 and includes means 2 for collecting data which represents an identification number for that particular meter and data relating to the current readings of the meter. The data packet may be enhanced by the addition of cyclic redundancy check data.

The data signal is supplied to an input of an oscillator means 4 in which a carrier signal is frequency modulated by the data. This modulated carrier is fed to a phase modulator 6 which multiplies the signal with a pseudo-random code supplied from a store 8. The phase modulator 6 produces plus/minus 90 degree phase modulations sometimes known as phase reversal keying. The carrier component of the resulting signal is thereby suppressed so that the bandwidth of the resulting signal is very wide and a function of the chip or clock rate of the pseudo-random code fed from the store 8. The output signal from the phase modulator 6 is fed by an amplifier 10 to a transmitter antenna 12.

The design permits requirements for low power density in a narrow bandwidth such as specified in such FCC part regulation 15.247, to be met.

The described transmitter design differs from the prior art systems in that the digital modulation is not added to the pseudo-random code. Instead the data is frequent modulated on to the carrier, but the carrier itself is suppressed by the action of the balanced phase modulator 6. This suppression occurs with any pseudo random code that has zero DC component.

Figure 2:
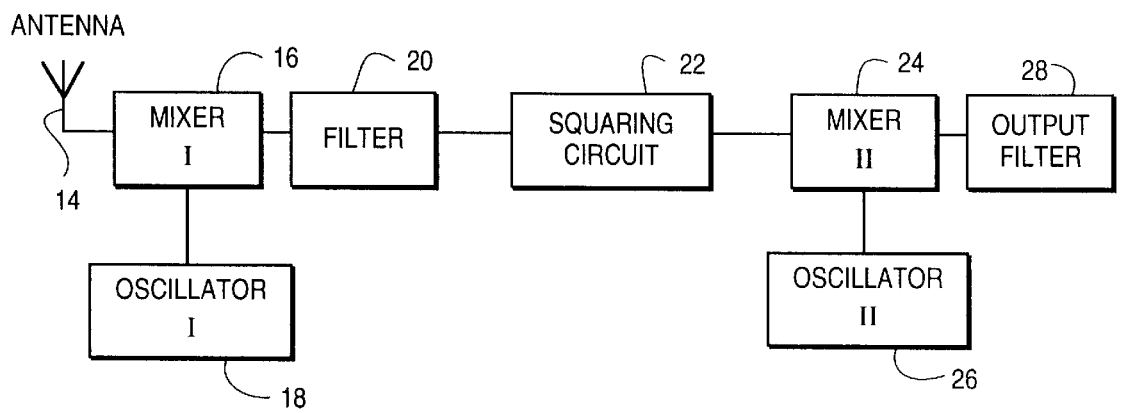
FIG. 2 shows a block diagram of a spread spectrum receiver from an interrogate/receiver instrument used in the remote meter reading system.

The remote meter reading system also includes an interrogate/receiver instrument which incorporates a means of transmitting a wake up signal to activate the transponders. The arrangement for this are not part of the present invention and will not therefore be described in detail. The receiver part of the interrogate/receiver instrument is shown in FIG. 2. For the purposes of the present example, it will be assumed that the centre frequency of the transmission by the transponders is at 915 MHz., although it will be appreciated that other frequencies may be employed.

The receiver includes an antenna 14 which is connected to a mixer 16 which is also provided with an input from a local oscillator 18 which in this example is set at 985 MHz. The output from the mixer is fed to a filter 20 which selects the difference frequency of 70 MHz. The filter 20 must have a sufficient bandwidth to accommodate the entire spread transmission which is now centered on the lower frequency. The output signal from the filter 20 is fed to a squaring circuit 22. The effect of this squaring operation is to regenerate the carrier which was suppressed by the transponder but at twice the first IF frequency, in this example 140 MHz. This regenerated carrier will only be modulated by the original data signal and therefore has a narrow bandwidth. In order to select this signal from the remaining spread spectrum information, the output from the squaring circuit is fed to a narrow band receiver tuned to 140 MHz. This narrow band receiver consists of a second mixer 24 which is fed by a second local oscillator 26 tuned to 150.7 MHz. An output filter 28 selects the difference signal at 10.7 MHz and the data is then decoded by means of a conventional FM discriminator at 10.7 MHz (not shown).

The present system has the advantages of spread spectrum technology which eliminates the effect of interference that may prevent effective use of a fixed frequency system in certain areas. However, it does not require such a complex receiver as the ENSCAN type systems which effectively employ frequency hopping. Because of the modulation system employed, the locking step normally required in this type of spread spectrum system is eliminated. Therefore the transmissions from the transponder can be kept short which is necessary for vehicle based reading systems. The system maintains the advantages of a non-spread design because the noise bandwidth and hence the sensitivity is still determined by the relatively narrow bandwidth of the final IF.

I claim:
1. A remote meter reading system, comprising:
   means for collecting data from meters;
   means for providing a carrier signal;
   means for frequency modulating the carrier signal with the data to produce a first signal;
   a phase modulator for receiving the first signal and producing an output signal in which the carrier signal frequency is suppressed; and
   a transmitter for transmitting the output signal to a receiver.
2. The remote meter reading system according to claim 1, wherein the phase modulator is using a pseudo-random code that has zero DC component.
3. The remote meter reading system according to claim 1, including a receiver comprising:
   means for receiving the transmitted spread spectrum signal and a squaring means.
4. The remote meter reading system according to claim 3, wherein the means for receiving the transmitted spread spectrum signal comprises:
   a first mixer connected to an antenna;
   a first oscillator providing an input signal to the first mixer; and
   a first filter connected to the first mixer output and to the squaring means input.
5. The remote meter reading system of claim 4, including a narrow band receiver having:
   a second mixer connected to the squaring means output, a second oscillator providing an input signal to the second mixer and an output filter.
6. A transponder for use in a remote meter reading system, comprising:
   means for frequency modulating a carrier signal with data to produce a first signal;
   means for phase modulating the first signal with a pseudo random code to produce an output signal in which the carrier frequency is suppressed; and
   means for transmitting the output of the phase modulating means.

* * * * *